May 26, 1942.  B. C. BELLOWS, JR  2,284,359
COFFEE MAKER
Filed Sept. 26, 1940
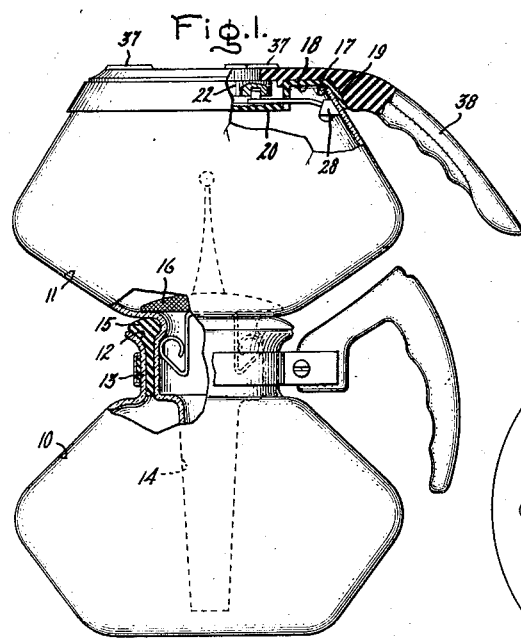
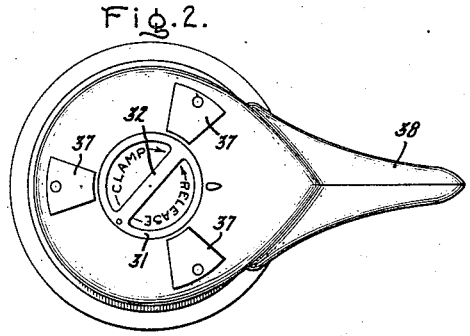
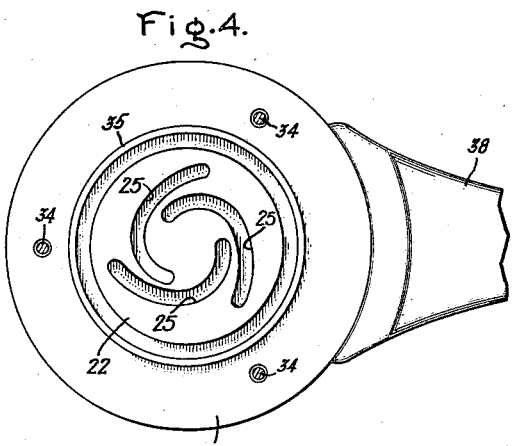
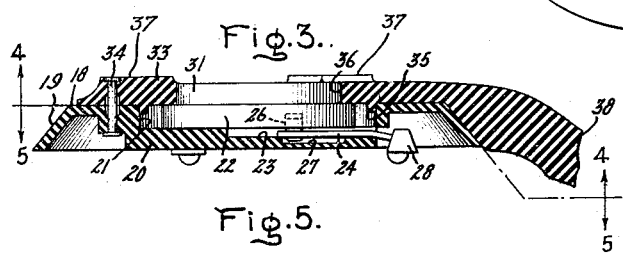
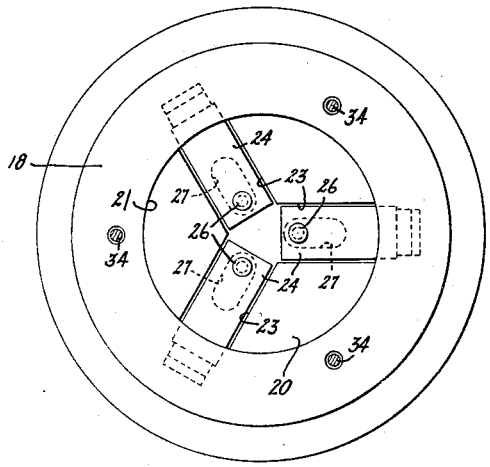
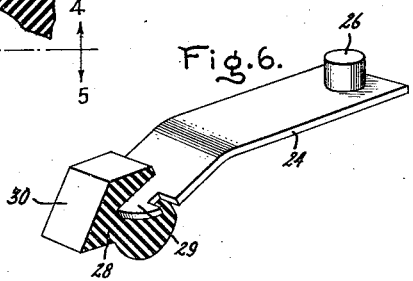
Inventor:
Brian C. Bellows, Jr.
by Harry E. Dunham
His Attorney.

Patented May 26, 1942

2,284,359

UNITED STATES PATENT OFFICE 2,284,359

COFFEE MAKER

Brian C. Bellows, Jr., Orange, N. J., assignor to General Electric Company, a corporation of New York Application September 26, 1940, Serial No. 358,491

7 Claims. (Cl. 53—3)

This invention relates to coffee makers, more particularly to coffee makers of the vacuum-type wherein heated water is transferred from a water heating bowl to a coffee infusion bowl where the brew is made and thereafter returned to the water heating bowl when the heat applied thereto has been reduced sufficiently, and it has for its object the provision of an improved cover structure for the coffee infusion bowl.

More specifically, this invention contemplates the provision of a cover structure for the infusion bowl constructed and arranged so that it can be locked to the infusion bowl whereby it may function as a handle for removing the infusion bowl from the water heating bowl. Generally, the infusion bowl is made of a fragile material, such as glass, and it is a further object of this invention to provide means for locking the cover to the fragile glass bowl so as to prevent damage to the bowl when the cover is locked to it, and when the cover is being used as a handle to remove the bowl.

In another of its aspects, this invention contemplates a cover structure which will function as a base or support for the infusion bowl after it has been separated from the water heating bowl.

In accordance with this invention, the cover structure comprises a cover for the opening of the infusion bowl which fits over the opening, and which has a skirt that embraces the upper section of the bowl adjacent the opening. The cover carries a plurality of rigid fingers which are adapted to be moved inwardly and outwardly with reference to the skirt. These rigid fingers carry resilient feet which are adapted to engage the inner wall of the bowl opposite the skirt when the fingers are moved outwardly so as to clamp the wall to the cover. While the cover is firmly clamped between the skirt and the fingers, the resilient feet are so constructed and arranged as to prevent damage to the fragile walls of the bowl.

The cover structure further comprises suitable operating means accessible above the cover for operating the fingers outwardly to lock the cover to the bowl, and inwardly to release the bowl.

The cover further comprises suitable flat surfaces in the form of protuberances for supporting the infusion bowl in an inverted position when it is separated from the water heating bowl.

For a more complete understanding of this invention, reference should be had to the accompanying drawing in which Fig. 1 is a vertical elevation, partly in section, of a vacuum-type coffee maker provided with a cover structure arranged in accordance with this invention; Fig. 2 is a top plan view of the cover structure used in the apparatus of Fig. 1; Fig. 3 is an enlarged central sectional view taken through the cover structure shown in Figs. 1 and 2; Fig. 4 is a sectional view taken through the line 4—4 of Fig. 3 and looking in the direction of the arrows; Fig. 5 is a sectional view taken through the line 5—5 of Fig. 3 and looking in the direction of the arrows; and Fig. 6 is an enlarged perspective view of one of the clamping fingers used in the cover structure of Figs. 1–5.

Referring to the drawing, this invention has been shown as applied to a vacuum-type coffee maker comprising a lower water heating bowl 10, and an upper coffee infusion bowl 11. As shown, the water heating bowl 10 is provided in its upper end with an opening 12 which is formed by an upright neck 13 on the upper end of the bowl. The upper bowl is provided with a depending liquid transfer tube 14 which is inserted through the opening 12 into the lower bowl 10, as shown in Fig. 1. Secured to the upper end of the transfer tube 14 is a rubber gasket 15 which seats in the neck 13 to support the upper bowl 11 on the lower bowl 10, and to effect a fluid-tight seal between the two bowls when the upper bowl is seated on the lower bowl. A suitable filter 16 is mounted in the upper bowl 11 over the transfer tube 14. The upper bowl, as shown, is provided at its upper end with a relatively large opening 17 through which the filter is inserted and through which the coffee grounds can be placed into the bowl.

Generally, the bowls 10 and 11 are formed of a suitable heat-resistant glass. And in the specific form of the invention illustrated, the walls of the bowls taper outwardly and downwardly from their upper ends to substantially the mid-section of the bowls where they incline inwardly and downwardly, as clearly shown in Fig. 1.

It will be understood that in making coffee in a vacuum-type coffee maker of this character, the water is placed in the lower bowl 10 and the coffee grounds are placed in the upper bowl 11 over the filter 16. Heat is then applied to the lower bowl by any suitable means, such as an electric hot plate (not shown), and when the water has been heated sufficiently it is forced upwardly through the tube 14 into the infusion bowl 11 by the generation of pressure in the water heating bowl 10 above the liquid level.

This steeps the coffee grounds so as to make the coffee brew. When the heat applied to the bowl 10 is reduced the vapor in this bowl condenses and creates a vacuum so as to draw the coffee brew back through the tube 14 into the bowl 10. After this, it is necessary to remove the upper bowl 11 from the lower bowl in order to dispense the coffee brew from the lower bowl.

I have provided a suitable cover structure for the opening 17 in the upper end of the upper bowl which can be locked to the upper bowl so that the cover can be used as a handle to remove the upper bowl without the necessity of touching the heated walls of the bowl. This cover structure comprises a cover 18 which is arranged to be placed over the opening 17 in the upper bowl, as clearly shown in Fig. 1. The cover 18 is provided with a depending angular flange-like wall or skirt 19 which has the same inclination as the side walls of the upper bowl adjacent the opening 17, as shown in Fig. 1. This skirt 19 embraces and closely fits the upper portions of the side walls of the bowls, as clearly shown in this figure.

The cover 18 is provided with a central cylindrical depressed extension 20 whose vertical central axis coincides with the vertical central axis of the cover. This extension defines a circular recess 21 centrally positioned in the cover. Mounted within this recess 21 is a circular cam 22, and positioned in the bottom wall of the extension 20 under the recess 21 are a series of radially-positioned recesses 23. These recesses 23 extend from the center of the extension 20 outwardly to the side walls thereof where they open through the side walls, as shown in Figs. 3 and 5.

Mounted within the radial recesses 23 are a series of rigid fingers 24 which are mounted for sliding movement in the recesses inwardly and outwardly with reference to the center of the cover. These fingers are operated inwardly and outwardly by the cam 22. For this purpose, the cam is provided with a series of curved cam slots 25, one being provided for each finger 24. Each finger at its inner end carries an upright stud 26 which is received in its associated cam slot 25. The cam slots 25 are so arranged that when the cam is rotated in a clockwise direction, as viewed from above, the fingers are forced outwardly, whereas when the cam is rotated in the opposite direction the fingers are withdrawn. The studs 26 are in the form of rivets extending through the fingers and each of the recesses 23 is provided in its bottom wall with a deeper recess 27 to provide for free sliding movement of the headed end of the rivet.

The outer ends of the fingers carry resilient feet 28 formed of any suitable material, but preferably they will be made of rubber. These feet 28 are molded separately, and are provided with slots that receive the ends of the fingers. These ends are provided with anchors 29 that are received in the slots so as to lock the feet to the fingers. The feet 28 are provided with surfaces 30 which are inclined so that when the fingers are forced outwardly, as shown in Fig. 1, they will abut the inner surfaces of the inclined walls of the bowl 11 opposite the skirt 19. It will be observed that when the fingers are thus forced outwardly they will wedge or clamp the upper sections of the wall to the skirt 19 so that the cover is securely locked to the wall.

The cam 22 is provided with an upright circular collar or wall 31 having a diameter somewhat less than the diameter of the cam and whose axis is coincident with the axis of the cam. A diametrical rib 32 extends from one side of the collar to the other, as shown in Fig. 2. This rib functions as a means for rotating the cam to drive the fingers inwardly and outwardly.

The cam 22 is secured in the recess 21 by means of a cap 33 which is secured to the cover 18 in any suitable manner, as by means of a series of rivets 34. The cap is provided with a downwardly projecting circular bead 35 having an outside diameter slightly smaller than the diameter of the recess 21, and at its center is provided with a circular aperture 36 having a diameter slightly larger than the outside diameter of the circular wall 31. It will be observed that the cap 33 holds the cam 22 in its proper operative position in the recess 21.

Preferably, both the cover 18 and the cap 33 will be formed of a material having a low heat conductivity, such as a suitable phenol condensation product, for example Bakelite.

It will be understood that in the operation of the device, when the cover has been placed over the opening 17 the operating member 32 will be rotated in a clockwise direction to cause the rigid members 24 to move outwardly to carry the resilient feet 30 firmly against the inner surfaces of the upper wall section of the bowl 11. As previously pointed out, this operation clamps this section of the wall securely to the skirt 19 of the cover. The skirt 19 and the cap 33 may then be grasped by the fingers so as to withdraw the upper bowl from the lower bowl after the coffee brew has been made. Generally, this requires considerable effort, but the fragile glass walls will not be broken by the application of this force to them, because of the provision of the resilient feet 28 on the ends of the rigid fingers 24, and because the surfaces 30 of these feet are relatively large and therefore apply the pressure to a fairly large area of the fragile wall.

It is contemplated that the cover structure also will serve as a base for supporting the infusion bowl 11 in an inverted position after it has been withdrawn. For this purpose, the top of the cap is provided with a series of protuberances 37 having flat upper surfaces, as clearly shown in Figs. 1, 2 and 3. These protuberances function as feet or supports for the cover structure and the upper bowl when these members are inverted.

If desired, the cap may be provided with a handle 38 which may be grasped to assist in removing the bowl 11 from the lower bowl 10. When this handle is used it is preferable to mold it integrally with the cap, as shown in Figs. 2 and 3.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a vacuum-type coffee maker having a water heating bowl and a fragile infusion bowl connected in liquid transfer relation to the water heating bowl, a cover structure for closing the opening in said infusion bowl comprising a cover for said opening having a section embracing the outer surface of the bowl wall around said opening, a plurality of rigid fingers carried by said cover movable inwardly and outwardly with reference to the inner surface of said wall, means for forcing said fingers inwardly and outwardly, and each of said fingers carrying a resilient member constructed and arranged to yieldingly engage said fragile wall with sufficient force to lock said cover to said wall when said fingers are forced outwardly so that the cover can be utilized as a handle for said bowl.

2. In a vacuum-type coffee maker having a water heating bowl, a fragile coffee infusion bowl adapted to be seated in said water heating bowl in sealed relation with it and a liquid transfer tube between the two bowls, a cover structure for the opening in said infusion bowl comprising a cover for said opening having a section embracing one side of said bowl around said opening, a plurality of fingers movable radially inwardly and outwardly with reference to said section on the other side of said bowl, means for moving said fingers toward said other side, and resilient feet on said fingers constructed and arranged to yieldingly engage said side to lock the cover to said bowl when said fingers are moved toward said side so that the cover can be used as a handle to remove said infusion bowl from the water heating bowl after the coffee brew has been made without breaking said fragile bowl.

3. In a vacuum-type coffee maker, a cover structure for closing the opening in one of the bowls of the coffee maker comprising a cover for said opening having a centrally positioned circular recess therein, a cap attached to said cover over said recess having a circular opening therein communicating with said recess and also a shoulder overhanging said recess, a rotatable cam located in said recess secured therein by said shoulder and having a circular operating member extending upwardly through said opening so that it is accessible at the top of said cap, and means operated by said cam for engaging said bowl to lock the cover to said bowl.

4. In a vacuum-type coffee maker, a cover structure for closing the opening in one of the bowls of the coffee maker comprising a cover for said opening having a centrally positioned circular recess therein, a cap attached to said cover over said recess having a circular opening therein communicating with said recess and also a shoulder overhanging said recess, a rotatable cam located in said recess secured therein by said shoulder and having a circular operating member extending upwardly through said opening so that it is accessible at the top of said cap, a plurality of radially-positioned fingers mounted in said cover for radial sliding movement so that their outer ends can be moved into abutting relation with the inner wall of said bowl to lock the cover to said bowl, and means connecting said fingers to said cam so that they are moved inwardly and outwardly with reference to said wall when said operating member is rotated in opposite directions.

5. In a vacuum-type coffee maker having a coffee infusion bowl that is provided with an opening in its top, a cover structure for said opening comprising a cover for covering said opening, said cover having a centrally-positioned circular recess and a series of radially positioned recesses in the bottom of said circular recess, a cam rotatable in said recess, a series of fingers in said radially positioned recesses operated inwardly and outwardly therein by said cam, means on said fingers for engaging the wall of said bowl so as to lock the cover to said bowl, a cap over said cover having a centrally-positioned circular aperture of smaller diameter than said recess, and a circular operating member for said cam rotatably mounted in said opening.

6. In a vacuum-type coffee maker having a water heating bowl and a coffee infusion bowl connected in liquid transfer relation with said water heating bowl, a cover structure for the opening in said infusion bowl comprising a cover for said opening, a plurality of rigid fingers carried by said cover movable inwardly and outwardly with reference to the inner surface of the side wall of said bowl, means for forcing said fingers inwardly and outwardly, and each of said fingers carrying a resilient member constructed and arranged to yieldingly engage said cover with sufficient force to lock said cover to said wall when said fingers are forced outwardly so that said cover can be used as a handle for the infusion bowl.

7. A vacuum-type coffee maker comprising a coffee infusion bowl having an opening in the top and a wall inclined outwardly and downwardly from said opening, a cover for said opening having an inclined skirt fitted to the outer surface of said wall, a series of rigid fingers carried by said cover and movable inwardly and outwardly with reference to the inner surface of said wall, resilient members on the ends of said fingers provided with inclined surfaces constructed and arranged to yieldingly engage said inner surface when said fingers are moved outwardly so as to lock said cover to said wall, and means for moving said fingers outwardly and inwardly with reference to said wall.

BRIAN C. BELLOWS, Jr.